United States Patent
Lochmann

[11] 3,814,217
[45] June 4, 1974

[54] ACTUATING MECHANISM FOR DISK BRAKE

[76] Inventor: Heinz Lochmann, Kuckucksweg 5, 6378 Oberstedten/Ts, Germany

[22] Filed: Jan. 24, 1973

[21] Appl. No.: 326,472

[30] Foreign Application Priority Data
Apr. 21, 1972 Czechoslovakia............... 2711-72

[52] U.S. Cl................ 188/72.8, 184/29, 188/264 B
[51] Int. Cl.......................................... F16d 55/224
[58] Field of Search ............. 188/72.7, 72 B, 264 B; 184/6.1, 6.12, 29, 39

[56] References Cited
UNITED STATES PATENTS

| | | | |
|---|---|---|---|
| 1,453,050 | 4/1923 | Link | 188/264 B |
| 1,511,951 | 10/1924 | Diller | 188/264 B |
| 2,612,968 | 10/1952 | Hood | 188/72.8 X |
| 3,064,758 | 11/1962 | Ohrnberger | 184/6.12 |
| 3,653,470 | 4/1972 | Travis | 188/72.6 X |

FOREIGN PATENTS OR APPLICATIONS

| | | | |
|---|---|---|---|
| 1,006,224 | 4/1957 | Germany | 184/6.12 |
| 1,137,275 | 9/1962 | Germany | 184/6.12 |

Primary Examiner—George E. A. Halvosa
Attorney, Agent, or Firm—Karl F. Ross; Herbert Dubno

[57] ABSTRACT

A movable brakeshoe, confronting a rotating brake disk, is shiftable in axial direction of the disk by the swinging of a lever in a plane parallel to the disk, the lever motion being translated into an axial displacement of a thrust rod by a screw coupling between the rod and a coaxial shaft rigid with the lever. The screw coupling includes a nut closed at one end and a bolt partly threaded into that nut from the other end, the projecting part of the bolt being shrouded by an annular chamber which receives lubricating oil extruded between the screw threads upon an inward movement of the bolt and feeds it back to the nut through a check valve upon an outward movement.

4 Claims, 3 Drawing Figures

ACTUATING MECHANISM FOR DISK BRAKE

FIELD OF THE INVENTION

My present invention relates to a disk brake of the type wherein a disk entrained by a rotating load, such as a vehicle wheel, is juxtaposed with an axially movable brakeshoe whose displacement in a disk-engaging direction is controlled by mechanical, electromagnetic or fluidic means.

Upon such displacement, the disk is clamped between the movable brakeshoe and a backstop usually designed as a stationary brakeshoe. Reference may be made in this connection to my prior U.S. Pat. No. 3,630,320.

BACKGROUND OF THE INVENTION

According to the disclosure of that prior patent, the movable brakeshoe is operatively shifted against the force of a restoring spring by a pair of coacting cams, one of them being fixed to the brakeshoe while the other is mounted on a spindle whose rotation about an axis parallel to that of the disk is translated into an axial motion of the brakeshoe-supported cam. Such an arrangement offers a mechanical advantage in that a relatively large swing of a lever rigid with the spindle is converted into a relatively small axial displacement of the brakeshoe. However, the effective swing of the lever is limited and cannot be conveniently readjusted to compensate for a significant wear of the brakeshoe lining.

OBJECTS OF THE INVENTION

An important object of my present invention is to provide, in a brake system of this character, an improved actuating mechanism which avoids the aforestated drawback.

A more particular object is to provide means in such mechanism for automatically lubricating the coacting parts to minimize the coupling friction that must be overcome by the brake actuator.

SUMMARY OF THE INVENTION

These objects are realized, in accordance with my present invention, by the provision of a screw coupling between a rotatable control member and an axially shiftable thrust member bearing upon the movable brakeshoe, this screw coupling resulting in a shift of the thrust member proportional to the angle of rotation of the control member about an ancillary axis parallel to the axis of the brake disk. If the meshing threads of the male and female halves of this coupling are long enough, any wear of the brake lining of the movable and/or the stationary brakeshoe can be compensated in a relatively simple manner by a readjustment of the stroke, as by changing the position of an actuating lever fastened onto the rotatable control member.

Advantageously, the screw coupling includes a nut on one of these members closed at one end and a bolt on the other member partly threaded into the nut, the meshing threads of the nut and bolt being continuously lubricated by a fluid such as oil circulating through these threads and through a conduit disposed between the interior of the nut and a region adjacent the projecting part of the bolt. This conduit, forming a return path to feed back to the nut during bolt withdrawal whatever lubricant has been extruded through the threads during a preceding penetration of the nut by the bolt, preferably contains a check valve for preventing the outflow of lubricant from the nut except by way of the meshing threads which are thereby always well oiled. The extruded lubricant may be caught in an annular collector chamber enshrouding the projecting bolt portion.

BRIEF DESCRIPTION OF THE DRAWING

The above and other features of my invention will be described in greater detail hereinafter with reference to the accompanying drawing in which.

SPECIFIC DESCRIPTION

Figure 1:
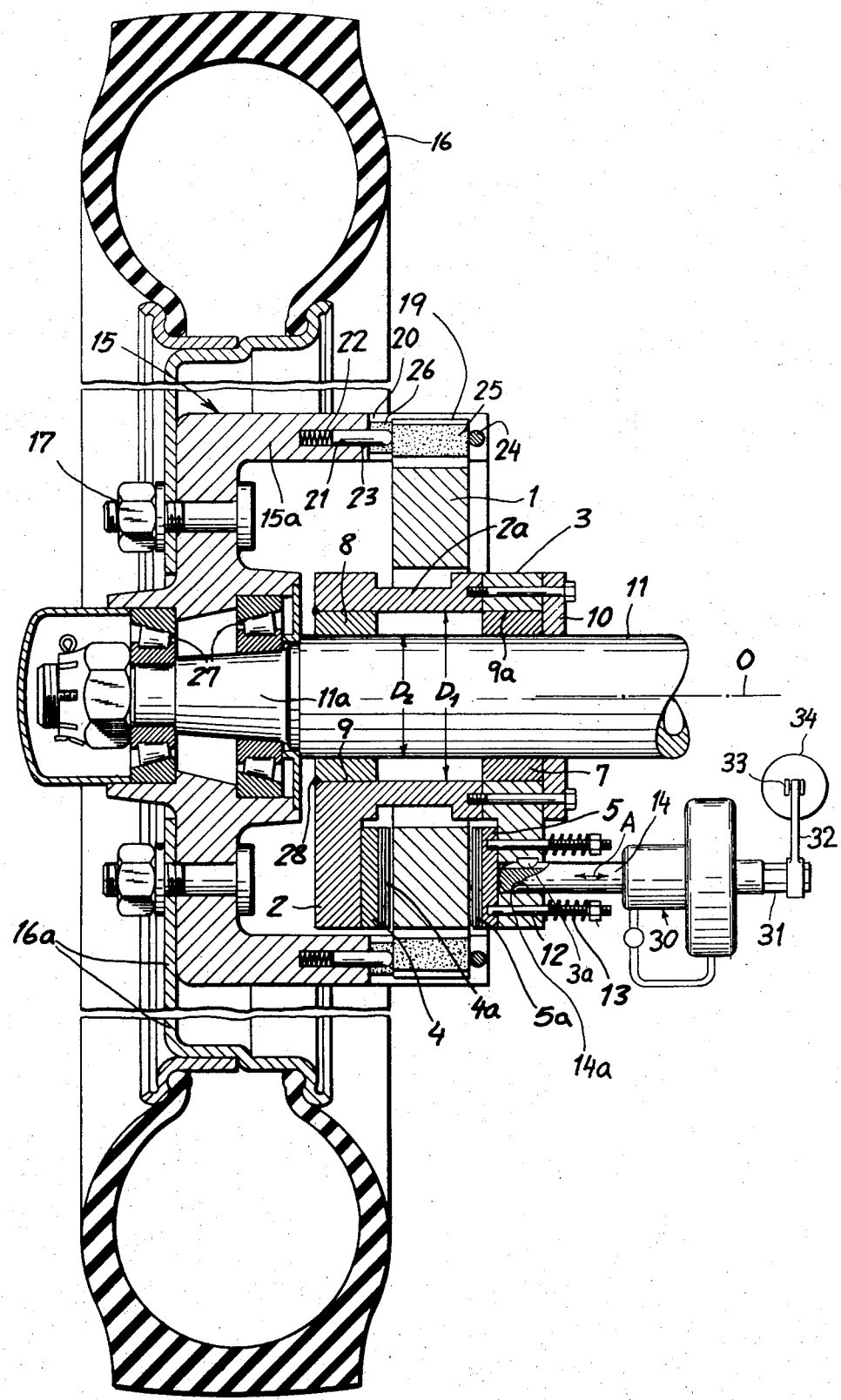
FIG. 1 is an axial sectional view of a disk-brake assembly with an actuating mechanism embodying the invention.

The system shown in FIG. 1 comprises an annular brake disk 1 centered on the axis 0 of a wheel 16 which may be a nondriven road wheel of a heavy-duty vehicle. The wheel hub 16a is bolted at 17 to a bell-shaped carrier member 15 which is supported by two sets of frustoconical bearing rollers 27 on a tapering tip 11a of a stationary axle 11 passing with clearance through the central aperture of disk 1. Two parallel plates 2, 3, perpendicular to axis 0, are secured on opposite sides of disk 1 to the wheel axle 11 as the two arms of a yoke straddling the disk from within. Plate 2 has an eccentric aperture 9 which is framed by a collar 2a passing axially through the clearance between axle 11 and disk 1; the diameter $D_1$ of this aperture is somewhat larger than the diameter $D_2$ of the axle and equals the diameter of a similar aperture 9a in plate 3. A ring 8, shrunk onto or otherwise rigidly fastened to axle 11, fits tightly into the aperture 9 of plate 2 and is welded thereto at 28. A similar ring 7, rigid with axle 11 but spaced from ring 8, occupies the aperture 9a of plate 3 which is bolted onto collar 2a by screws 18 traversing an end plate 10; the latter plate is of flat annular shape and bears upon ring 7 as well as upon plate 3 flush with that ring.

The disk 1 could be of the two-part construction described in my prior U.S. Pat. No. 3,630,320. The rings 7, 8 form accurately machined seats for the plates 2, 3 and obviate the need for truing the surface of axle 11.

Plates 2 and 3 carry a pair of segmental brakeshoes 4, 5 with respective brake linings 4a, 5a. Brakeshoe 4 is fixedly bolted to plate 2 whereas brakeshoe 5 is movably mounted on plate 3 with the aid of bolts 12 that are anchored to that brakeshoe but are freely slidable in bores of the plate and are biased outwardly (to the right in FIG. 1) by springs 13. The stress of springs 13 can be adjusted by tightening or loosening nuts 12' threaded onto the free ends of the bolts. Brakeshoe 5 can be axially displaced by means of a thrust rod 14, as symbolized by an arrow A, under hydraulic or pneumatic pressure in response to operation of a nonillustrated brake pedal through the intermediary of a screw coupling 30, more fully illustrated in FIG. 2, which translates the rotation of a spindle 31 coaxial with rod 14 (arrow B) into an axial shift of the latter. Spindle 31 is rigid with a lever 32 articulated to a piston 33 of a hydraulic jack 34 to which pressure fluid is admitted upon actuation of the brake pedal as is well known per se. Rod 14 is lodged in a bore 14a of plate 3 between bolts 12 and is held against rotation by a key 3a.

Disk 1 is formed with several (e.g. four) peripherally equispaced radial lugs 19 which serve to couple the disk with the wheel 16 for joint rotation. Carrier 15 has a cylindrical skirt 15a serving as an annular coupling member, this skirt being provided with a like number of peripherally equispaced slots 20 respectively receiving the lugs 19. Axially extending bores 21 in skirt 15a accommodate respective coil springs 22 as well as parts of a set of pressure pins 23 which bear axially upon the corresponding lugs 19. The pressure of pins 23 tends to shift the disk 1 away from plate 2, to an extent permitted by stops 24 here shown as transverse pins lodged in throughgoing bores of the carrier 15 near the open ends of the slots 20. Upon engaging these stops, disk 1 stands clear of both brakeshoes in the withdrawn position of brakeshoe 5 as illustrated in FIG. 1.

Each lug 19 is laterally reinforced by a pair of wedge shaped shims 25 engaging respective shims 26 of relatively inverted wedge shape which line the associated slot 20. The inner shims 25 are replaceably mounted on the lug and are in full-face contact with the outer shims 26 which are replaceably secured to the slot walls. The parting surfaces of each pair of shims advantageously lie along a radius originating at axis 0; these parting surfaces, therefore, diverge in a generally outward direction so that each lug 19 with its shims 25 has a substantially trapezoidal profile. With the diameter of disk 1 somewhat smaller (at least in the cold state) than the inner diameter of skirt 15a, the disk may thermally expand without materially altering the close but sliding fit between the two sets of shims.

The assembly 19 – 26 has been claimed in my copending application Ser. No. 326,455 of even date.

Figure 2:
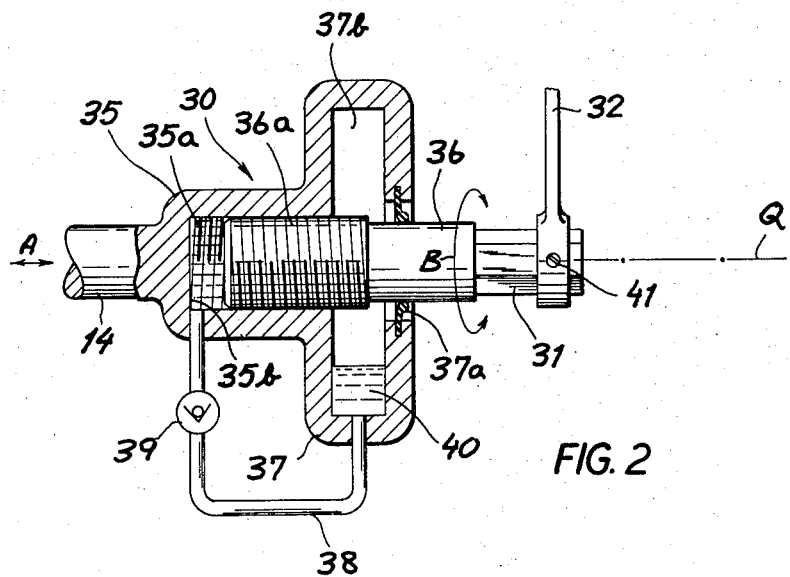
FIG. 2 is a side-elevational view (partly in section) of a screw coupling included in the actuating mechanism of FIG. 1.

As shown in FIG. 2, thrust rod 14 is integral with a nut 35 forming part of the coupling 30, this nut being closed at its left-hand end proximal to that rod. A bolt 36 with screw threads 36a matingly engages the threads 35a of nut 35 into which it partially extends, leaving therein a substantially closed space 35b whose width depends upon the depth of penetration of the bolt 36. A shroud 37 encloses the open end of the nut 35 and the adjoining, outwardly projecting portion of bolt 36 which it engages through a resilient lip seal 37a. Shroud 37 forms an annular collector chamber 37b for a sump of lubricating oil 40, this chamber being connected to space 35b through a return conduit 38 containing a check valve 39 which prevents the outflow of oil from space 35b to chamber 37b through that conduit.

Upon actuation of the lever 32 to engage the brake, spindle 31 and bolt 36 rotate about their axis Q (parallel to disk axis 0) in a sense causing partial withdrawal of the bolt from nut 35, with consequent leftward displacement of rod 14 and widening of the space 35b. The resulting suction draws oil from the sump 40 through conduit 38 past the check valve 39 into the interior of nut 35, keeping the space 35b substantially completely filled. When, thereafter, the rod 14 is restored to its previous position as the lever 32 swings back under the action of reverse pressure in cylinder 34 or of a spring not shown, the space 35b contracts so as to expel some of its oil content through the threads 35a, 36a into the collector chamber 37b where it again accumulates in sump 40. Thus, each reciprocation of rod 14 and brakeshoe 5 causes the circulation of some oil through the threads of screw coupling 30.

If the stroke of rod 14 requires readjustment upon substantial wear of brake linings 4a, 5a, the lever 32 may be remounted in a different angular position on spindle 31 which may have a polygonal profile as indicated in FIG. 2. A setscrew 41 helps retain the lever on the spindle.

Figure 3:
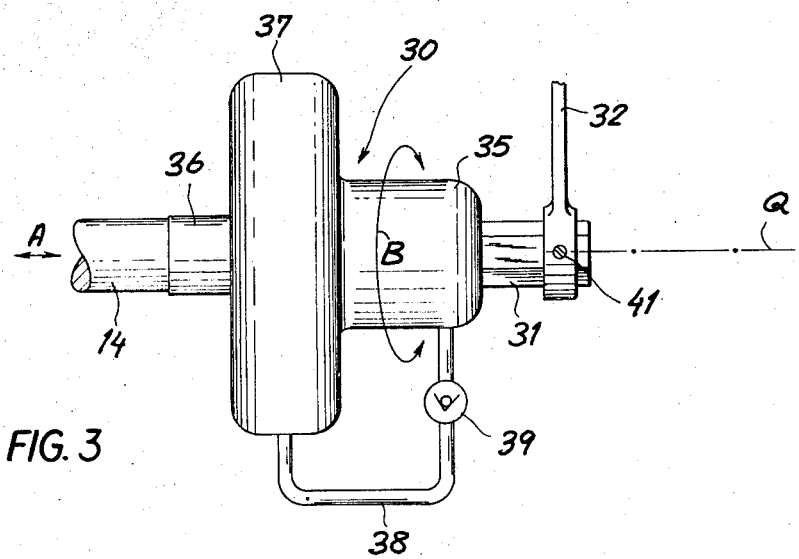
FIG. 3 is a side-elevational view similar to FIG. 2, showing a modified screw coupling.

FIG. 3 shows an inversion of the arrangement of FIG. 2, nut 35 being now rigid with spindle 31 whereas bolt 36 is integral with rod 14. In this instance, shroud 37 and conduit 38 rotate with the nut 35 about the spindle axis Q.

I claim:

1. In a disk brake comprising a disk rotatable about an axis, an axially movable brakeshoe confronting said disk, and mechanism for exerting axial pressure upon said brakeshoe to shift it in a disk-engaging direction against a restoring force, said mechanism comprising an axially shiftable thrust member bearing upon said brakeshoe, a control member in line with said thrust member rotatable about an ancillary axis parallel to the disk axis, and a screw coupling between said members for translating a rotation of said control member into an axial motion of said thrust member, the improvement wherein said screw coupling includes a shroud provided with a closed end on an extremity of one of said members, said shroud having an open end in line with said closed end spaced from said extremity, said shroud being internally threaded in the vicinity of said closed end to form a nut accessible through said open end, and a bolt rigid with the other of said members passing through said open end into threaded engagement with said nut, said shroud further forming a chamber for a lubricant adjacent said open end; further comprising a conduit extending from said chamber to said closed end and a check valve in said conduit preventing the outflow of lubricant from said closed end to said chamber whereby lubricant trapped between said bolt and said closed end can escape only through the meshing threads of said nut and said bolt upon increasing penetration of the former by the latter.

2. The improvement defined in claim 1 wherein said conduit comprises a tube disposed externally of said shroud.

3. The improvement defined in claim 1 wherein said shroud is provided at said open end with seal means engaging said bolt for preventing the loss of lubricant from said chamber.

4. The improvement defined in claim 1 wherein said chamber forms an annular channel about said open end.

* * * * *